(12) United States Patent
Silberschmidt et al.

(10) Patent No.: US 10,759,498 B2
(45) Date of Patent: Sep. 1, 2020

(54) AIR LUBRICATION SYSTEM WITH A WAVE DEFLECTOR FOR A VESSEL

(71) Applicant: SILVERSTREAM TECHNOLOGIES B.V., Amstelveen (NL)

(72) Inventors: Noah Silberschmidt, London (GB); Jørgen Clausen, Broendby (DK); Johannes Johannesson, Espergaerde (DK)

(73) Assignee: SILVERSTREAM TECHNOLOGIES B.V., Amstelveen (NL)

( * ) Notice: Subject to any disclaimer, the term of this patent is extended or adjusted under 35 U.S.C. 154(b) by 0 days.

(21) Appl. No.: 16/329,537

(22) PCT Filed: Aug. 30, 2017

(86) PCT No.: PCT/NL2017/050571
§ 371 (c)(1),
(2) Date: Feb. 28, 2019

(87) PCT Pub. No.: WO2018/044163
PCT Pub. Date: Mar. 8, 2018

(65) Prior Publication Data
US 2019/0193814 A1    Jun. 27, 2019

(30) Foreign Application Priority Data
Aug. 30, 2016    (EP) .................................... 16186407

(51) Int. Cl.
B63B 1/38    (2006.01)
(52) U.S. Cl.
CPC .......... *B63B 1/38* (2013.01); *B63B 2001/387* (2013.01); *Y02T 70/122* (2013.01)

(58) Field of Classification Search
CPC .... B63B 1/00; B63B 1/36; B63B 1/38; B63B 1/34
(Continued)

(56) References Cited

U.S. PATENT DOCUMENTS 5,839,384 A * 11/1998 Burg .................... B63B 1/38
114/67 A
9,545,978 B2 * 1/2017 Johannesson ............ B63B 1/38
(Continued)

FOREIGN PATENT DOCUMENTS

JP    2012/166704 A    9/2012
WO    93/01082 A1    1/1993
(Continued)

OTHER PUBLICATIONS

International Search Report, dated Oct. 10, 2017, from corresponding PCT/NL2017/050571 application.

*Primary Examiner* — Lars A Olson
(74) *Attorney, Agent, or Firm* — Nixon & Vanderhye

(57) ABSTRACT

Disclosed is a system for providing an air lubricating layer between the hull of a vessel and the water flowing under the hull as the vessel is moving through the water, including an air cavity and a wave deflector having a planar bottom surface which faces the interface plane and extends parallel thereto and is arranged in an air cavity of the air lubrication system at a distance of 2-15 cm from the interface plane, wherein the bottom surface has a peripheral edge that is spaced apart from the sidewalls by a gap having a width of 0.5-15 cm, wherein, when viewed in projection onto a plane wherein the planar bottom surface extends, at least 85% of the area of the opening is covered by the wave deflector and/or the planar bottom surface thereof, more preferably at least 90%, and most preferably at least 95%.

20 Claims, 4 Drawing Sheets

Figure 1:
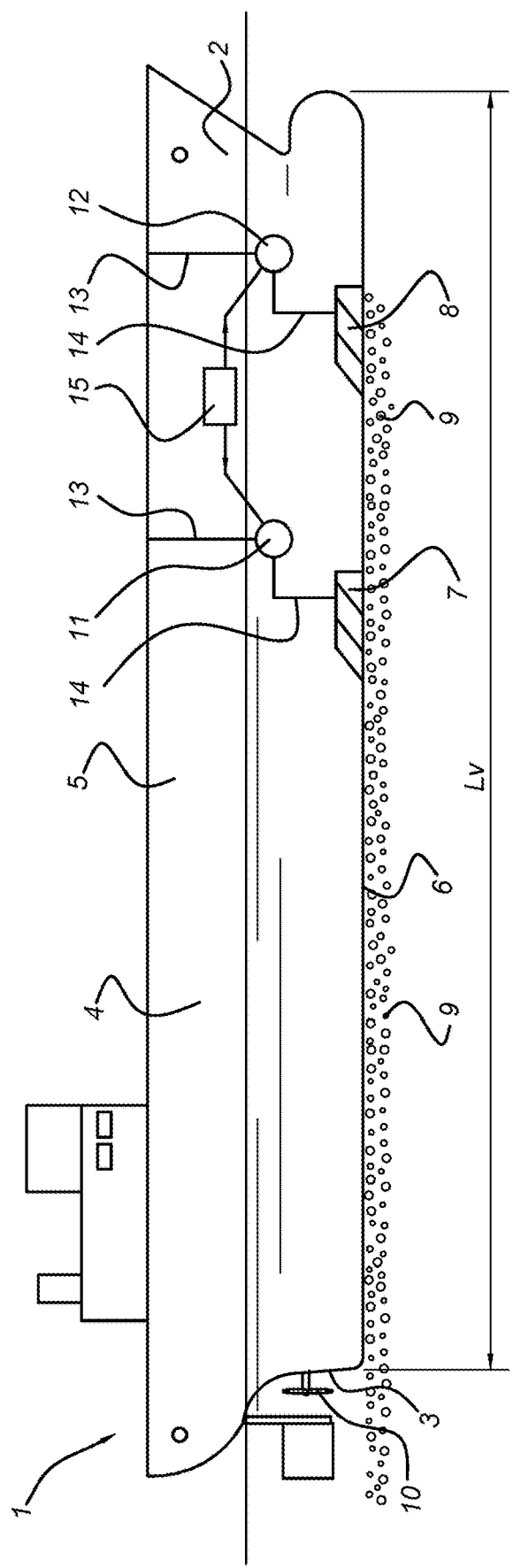

(58) Field of Classification Search
USPC .............................................. 114/67 A, 67 R
See application file for complete search history.

(56) References Cited

U.S. PATENT DOCUMENTS

| | | | |
|---|---|---|---|
| 9,855,996 B2* | 1/2018 | Johannnesson | ............ B63B 1/38 |
| 2004/0154514 A1* | 8/2004 | Burg | ......................... B63B 1/38 |
| | | | 114/67 A |
| 2011/0094435 A1* | 4/2011 | Takano | ..................... B63B 1/38 |
| | | | 114/67 A |
| 2012/0097089 A1* | 4/2012 | Takano | ..................... B63B 1/38 |
| | | | 114/67 A |
| 2013/0098285 A1* | 4/2013 | Takano | ..................... B63B 1/38 |
| | | | 114/67 A |
| 2017/0015394 A1* | 1/2017 | Johannesson | ............. B63B 1/38 |

FOREIGN PATENT DOCUMENTS

| | | | |
|---|---|---|---|
| WO | 2010/064911 | A1 | 6/2010 |
| WO | 2015/133900 | A1 | 9/2015 |
| WO | 2015/133901 | A1 | 9/2015 |

\* cited by examiner

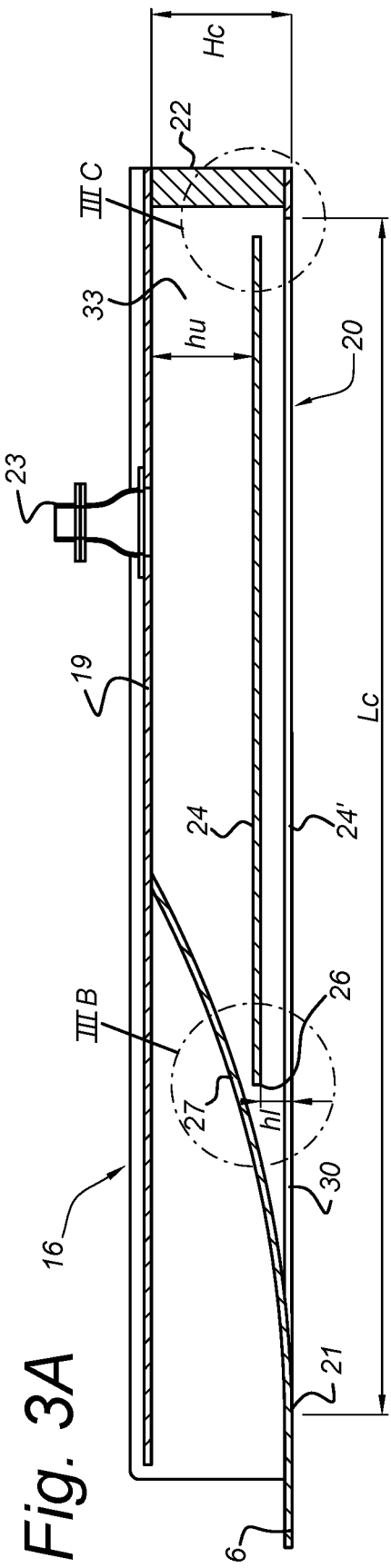
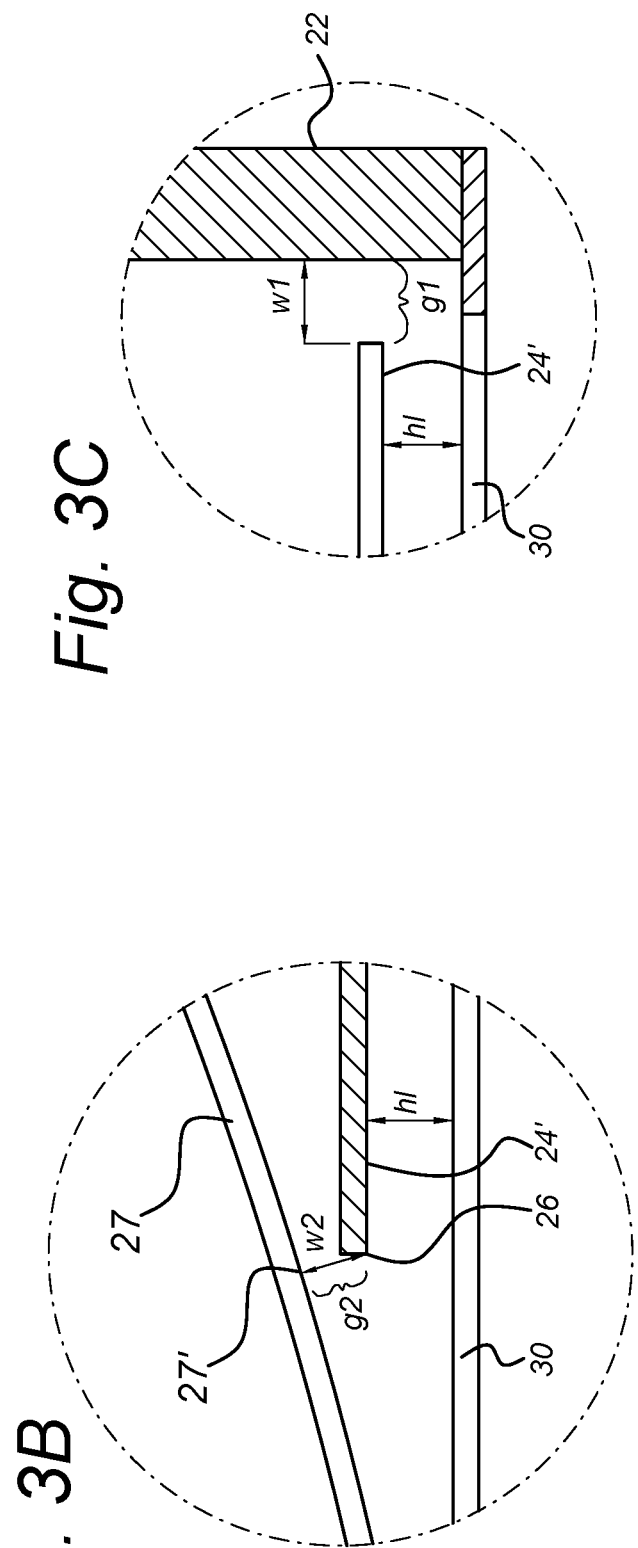

AIR LUBRICATION SYSTEM WITH A WAVE DEFLECTOR FOR A VESSEL

FIELD OF THE INVENTION

The present invention relates to an air lubrication system for providing an air lubricating layer between the hull of a vessel and the water flowing under the hull as said vessel is moving through the water, wherein said system is provided with an air cavity which comprises walls comprising sidewalls, a top wall and a rear wall, said walls defining said air cavity with an opening situated in an interface plane arranged opposite from said top wall, the opening having a circumferential edge in said interface plane as well as a front end and a rear end seen in the length direction of the air cavity, wherein a wave deflector is arranged in or at the cavity. The present invention further relates to a vessel or ship comprising such an air lubrication system.

BACKGROUND ART

WO 2010/064911 describes how to generate a layer of micro bubbles on the hull of a displacement vessel in order to reduce frictional drag, by means of a cavity being provided in a flat bottom area of the hull of a vessel, such that an opening of the cavity is at the flat bottom area. Air is injected into the cavity at such a rate that the water level in the cavity is kept substantially at the level of the hull of the vessel. Due to the forward movement of the vessel, the air in the cavity will move relative to the water at the speed at which the vessel is moving, or seen from the cavity, the water will flow past the cavity at that speed. This difference in velocity between the air and the water causes a so-called Kelvin Helmholtz Instability (KHI) which results in a mixing of air and water at the interface between the water and the air, and in a consequential generation of a layer of small sized air bubbles. The small size of these air bubbles makes them very stable and they tend to stay in the water for a relative long period. The small bubbles generated in the cavity are released there from at the rear edge of the cavity such that they form a stable lubricating layer extending a long distance along the bottom of the hull downstream of the cavity. In this way energy savings in propulsion of a vessel can be achieved.

WO 2015/133900 describes providing a number of wave deflectors that extend transversely across the cavity and are connected to sidewalls of the cavity, wherein the wave deflectors are arranged for facilitating emptying of an air cavity during start up. The wave deflectors reduce turbulence inside the cavity and cause air to be retained inside the cavity for a longer period of time such that compressors of reduced capacity for less powerful air injection during start up are required. By providing a wave deflector inside the cavity with a relatively long dimension in the cavity length direction, the cavity can be filled with air effectively while the vessel is sailing, e.g. at a speed of 20 knots. In operation, the deflector effectively shields the air-filled cavity from water entry due to waves and roll motions of the vessel, the elongate deflector part keeping the water surface inside the cavity stable during roll motions, such that a stable operation of the cavity is warranted. The deflectors are welded to the sidewalls Though an air lubrication system provided with such wave deflectors significantly reduces the drag on the hull of a vessel when in operation, i.e. when providing the air lubricating layer, when the system is not in operation the air cavities increase the drag on the hull.

It is an object of the present invention to provide an air lubrication system and vessel with reduced drag on the hull of the vessel, even when the air lubrication system is switched off.

It is a further object to provide an air lubrication system which is less susceptible to debris becoming lodged in the air cavity of the air lubrication system.

The present invention further aims to provide an air lubrication system in a relatively low volume of air suffices for expelling water from the air cavity

SUMMARY OF THE INVENTION

To this end, the present invention provides an air lubrication system for providing an air lubricating layer between the hull of a vessel and the water flowing under the hull as said vessel is moving through the water, wherein said system is provided with an air cavity which comprises: walls comprising sidewalls, a top wall and a rear wall, said walls defining said air cavity with an opening situated in an interface plane arranged opposite from said top wall, the opening having a front end and a rear end seen in the length direction of the air cavity; an air inlet spaced apart from the opening, wherein the length of the opening of the air cavity is between 2 and 10 m, and the distance of the top wall from the interface plane is between 0.2 m and 0.5 m; wherein said air lubrication system further comprises a wave deflector having a planar bottom surface which faces said interface plane and extends substantially parallel thereto and is arranged in said air cavity at a distance of 2-15 cm from the interface plane, wherein said bottom surface has a peripheral edge that is spaced apart from said sidewalls by a gap having a width of 0.5-15 cm, wherein, when viewed in projection onto a plane in which said planar bottom surface extends, at least 85% of the area of said opening is covered by said wave deflector and/or said planar bottom surface thereof, more preferably at least 90%, and most preferably at least 95%.

In this system at least 85% of the area of the opening in said projection is taken up by the wave deflector, while air may be transported into the air lubricating Kelvin Helmholtz interface layer via the gap which extends along the sidewalls and the peripheral edge of the bottom surface. The planar bottom surface substantially prevents water from entering the air cavity when the air lubrication system is not in operation, i.e. when no air is being introduced through the gap into the air lubricating layer.

Preferably, in said projection, the peripheral edge of the bottom surface encloses the entire wave deflector.

As most of the opening is covered and as the bottom surface of the wave deflector is typically parallel to the hull, the risk of solid objects, such as driftwood or the like, becoming lodged in the gap is minimized. Drag is thus further reduced.

Though the sidewalls typically extend transversely to said interface plane, and the rear wall may do so as well, it is not required that these walls extend perpendicular to the interface plane in order for the air lubrication system to function correctly. Preferably an air supply opening is placed in the top wall for connection to a compressor outlet duct.

The air that is injected into the cavity via the top wall, divides itself evenly from the top across the cavity and flows downwards via the gap along the deflector to form a stable air-water interface. By providing the air inlet in the top wall of the cavity, the air flow at the front end remains relatively undisturbed and an optimal air-mixing Kelvin Helmholtz interface is formed. This is especially advantageous in case a bullet- or dagger-shaped cavity is employed. The bottom surface is preferably a contiguous and closed surface, allowing a smooth flow of air and water there across.

In an embodiment, the gap has a substantially constant width, also improving the stability of the water-air interface. For this reason, the further gap preferably also has a substantially constant width.

In an embodiment, when viewed in said projection, said opening has an outer circumferential edge and the peripheral edge of the wave deflector's bottom surface has a smaller but similarly shaped contour as the outer circumferential edge of said opening and is spaced apart therefrom. The wave deflector can thus be mounted in the air cavity such that its center is aligned with the center of the opening, so that the gap through which air can be introduced into the air lubricating layer is formed between the circumferential edge of the opening and the outer circumferential edge of the bottom surface.

In an embodiment, when viewed in said projection, said opening has an outer circumferential edge and the length of the gap along the opening is at least half the length of the outer circumferential edge, preferably at least three fourths thereof, more preferably at least five sixth thereof. In general, both sidewalls will be completely spaced apart from the bottom surface by the gap, and there is no direct weld or the like between the bottom surface and the sidewalls. The gap can thus extend along a substantial part of the bottom surface of the wave deflector, allowing sufficient air to pass through the gap to form the air lubricating layer. Typically, the two sidewalls meet at the front end of the cavity so that the gap extends from the front end of the cavity along both sidewalls towards the rear end of the cavity.

In an embodiment, the rear wall extends from a rearward portion of the top wall to the interface plane towards the rear end of the air cavity, and wherein said bottom surface is spaced apart from said rear wall by a further gap having a width of between 0.5-15 cm. The width of the further gap is defined by the closest distance of the planar bottom surface to the rear cavity wall, which cavity rear wall may or may not extend beyond a rear edge of the bottom surface of the deflector. For instance when the rear wall does not extend perpendicular to the interface plane, the rear wall may extend beyond the rear edge of the bottom surface.

In an embodiment, the rear wall slopes from said rearward portion of the top wall towards the rear end of the air cavity. Such a sloping rear wall helps to guide air and water inside the cavity in a smooth flow pattern to an exit along an edge at the rear end of the air cavity, thus minimizing vertical dispersion and turbulence and optimizing drag reduction.

In an embodiment, the gap and said further gap substantially surround the planar bottom surface of the deflector so that substantially the entire planar bottom surface is spaced apart from said walls. Air can thus be introduced into the air lubricating layer through a gap which extends around the circumference of the planar bottom plane, so that air bubbles may reach all areas of said planar surface to mix with water. Preferably, the gap and the further gap transition into each other, forming a circumferential gap around the wave deflector.

In an embodiment, the wave deflector comprises multiple segments which together provide said bottom surface. The segments may be attached separately to the walls to allow more convenient mounting and/or replacement of the wave deflector or the segments thereof.

In an embodiment, the wave deflector comprises a single plate which provides the entire bottom surface. This allows the wave deflector to be of a particularly simple construction, e.g. it may be constructed as a single plate, preferably made from metal and having a substantially uniform thickness. Such a wave deflector may be obtained by cutting it from the hull of a ship at a position where an air cavity is to be provided.

In an embodiment said wave deflector has a thickness of between 0.4 and 10 cm, preferably 0.5 cm, and wherein the thickness of the entire wave deflector is preferably uniform. The entire wave deflector may thus simply be embodied as a metal plate.

In an embodiment the width of said planar bottom surface increases from the front end of the cavity towards the rear end of the air cavity along at least half the length of said planar bottom surface, preferably along the substantially the entire length of planar bottom surface. The deflector's bottom surface may for instance be bullet or dagger-shaped along at least the first half of its length and preferably along its entire length. This shape, and the corresponding shape of the gap between the sidewalls and the planar bottom surface, helps to improve the stability of the water-air interface.

In an embodiment, the air lubrication system further comprises a plurality of spacer arms which connect said wave deflector to the walls of said air cavity and bridge the gap there between. The spacer arms, when viewed in projection onto said interface plane, preferably cover less than 10% of the area of said opening that is not covered by said planar bottom surface, i.e. the spacer arms cover less than 10% of the gap between the walls of the air cavity and the wave deflector in said projection. The spacer arms may be connected in such a manner to the wave deflector that they remain free from the bottom surface, i.e. by connecting the spacer arms to an opposite top surface of the wave deflector, and/or to an edge surface thereof. The bottom surface can thus remain smooth. Preferably, the spacer arms extend substantially parallel to said planar bottom surface, e.g. from the sidewalls and/or from the rear wall to the wave deflector.

In an embodiment said planar bottom surface is a contiguous and closed planar surface, wherein all line segments between any two points on the outer circumferential edge of said bottom surface are completely contained within said surface. The planar surface thus has no recesses along its outer edge and no cut out portions in the surface itself, allowing a smooth flow of air over the outer edge of the planar surface towards the interface plane.

According to a second aspect, the present invention provides a vessel comprising a hull and an air lubrication system as described herein, the vessel having a substantially flat bottom, a propulsion device for sailing of the vessel, the interface plane being substantially at the level of the flat bottom.

SHORT DESCRIPTION OF DRAWINGS

Figure 2:
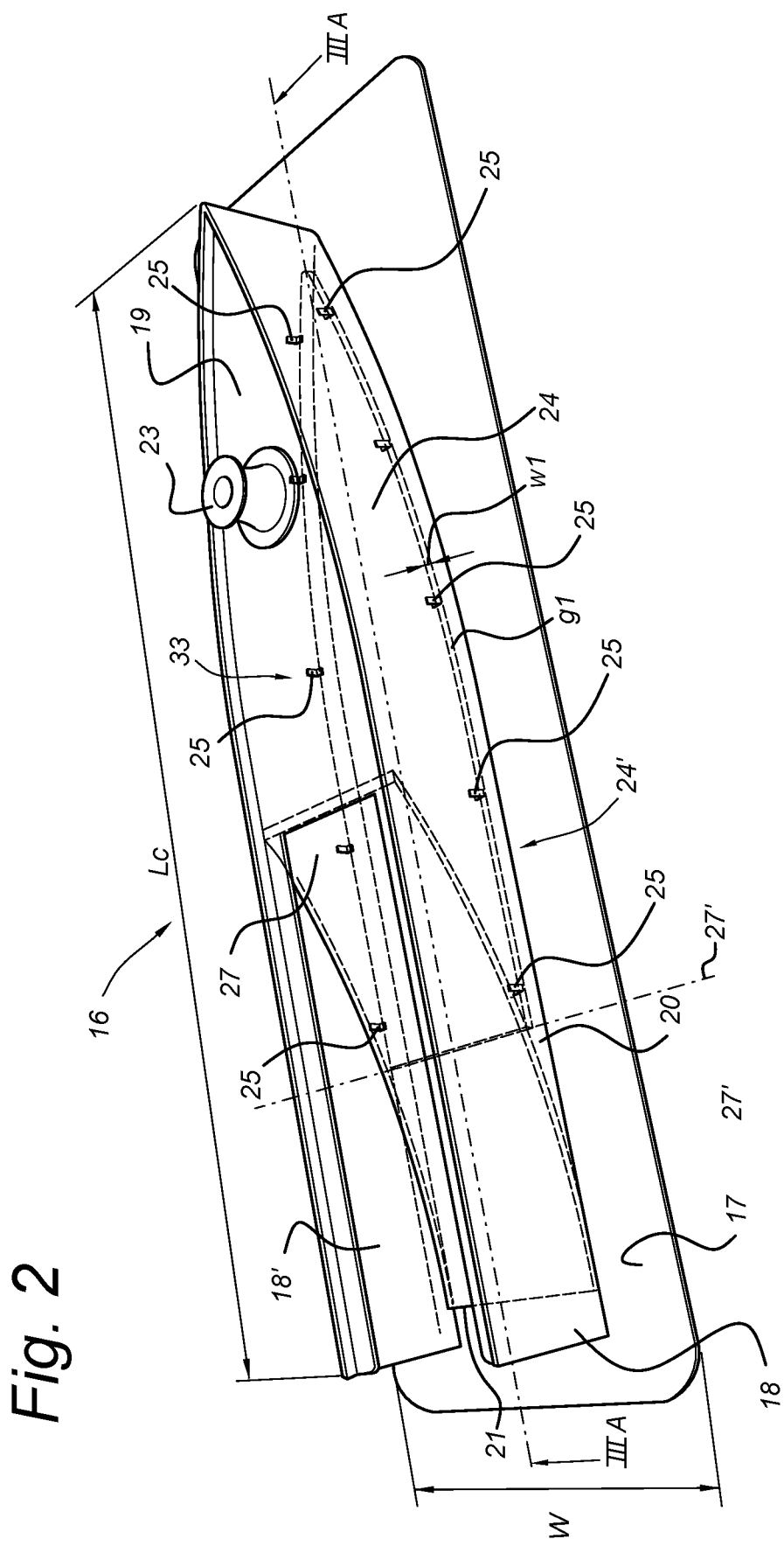
Figure 4:
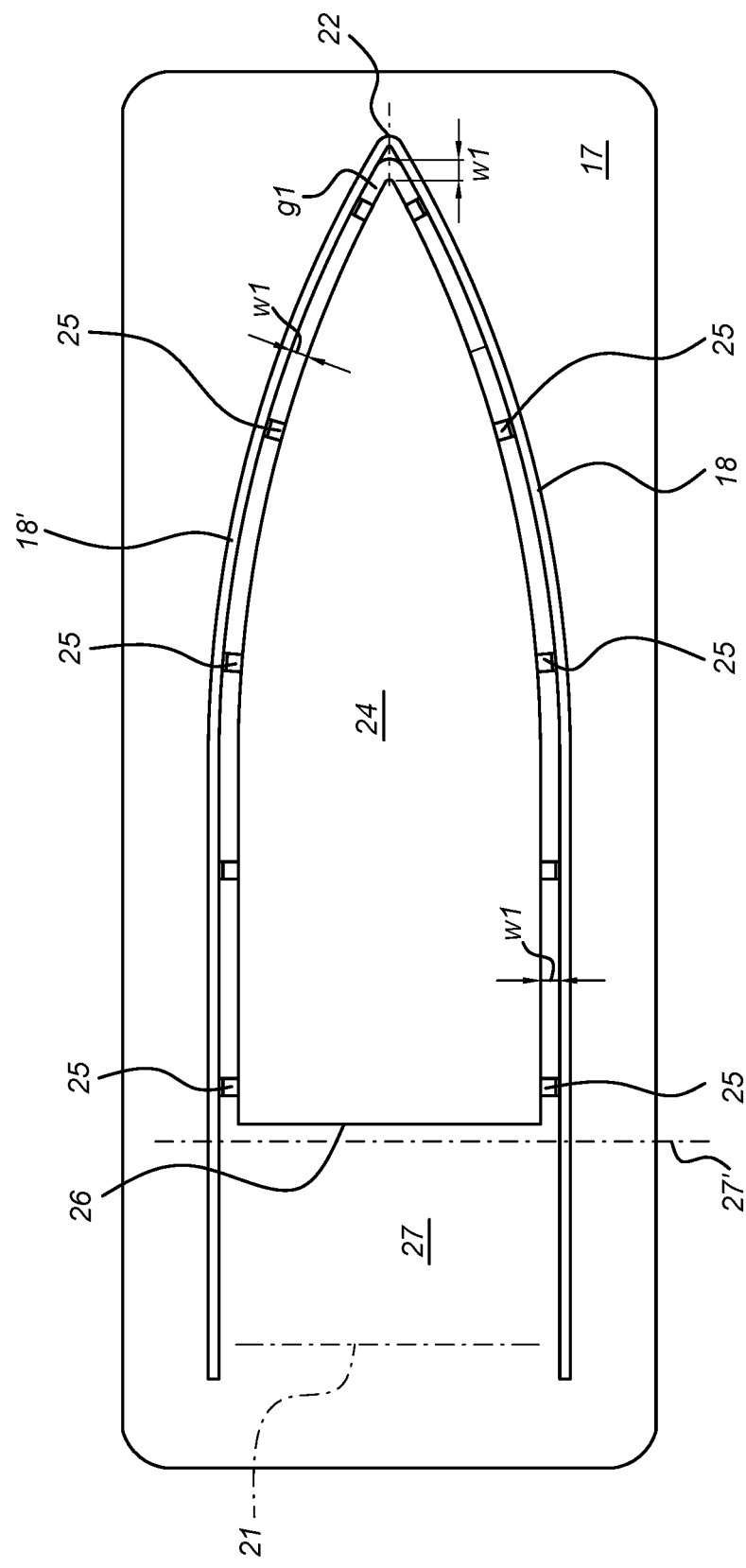

The present invention will be discussed in more detail below, with reference to the attached drawings, in which:

FIG. 1 shows a schematic side view of a vessel comprising an air lubrication system according to the invention, FIG. 2 shows a perspective view of an air lubrication system according to the invention, FIG. 3A shows a cross-sectional view of the system of FIG. 2, FIGS. 3B and 3C show portions of FIG. 3A in which gaps between the wave deflector and the walls of the air cavity are shown in more detail, FIG. 4 shows a bottom view of the system of FIG. 2.

DESCRIPTION OF EMBODIMENTS

FIG. 1 shows a vessel 1 having a length Lv of between 20 m and 500 m, and a width between 5 m and 75 m. The vessel 1 may have a water displacement of at least 10000 ton, preferably at least 50000 ton and is an ocean going vessel. The vessel 1 has a hull 4 with a bow 2, a stern 3, sides 5 a substantially flat bottom 6 and a propulsion device 10 in the form of a propeller. Air lubricating cavities 7,8 that are open in the plane of the bottom 6, are distributed along the bottom 6 to generate a layer of bubbles 9 travelling towards the stern 3, along the substantially flat bottom 6. Compressors 11,12 are connected to each cavity 7,8 for supplying air at the hydrostatic pressure inside each cavity at the prevailing draught level of the vessel. The compressors 11,12 are with an air outlet duct 14 connected to the cavities 7,8 and have an air inlet duct 13 for taking in ambient air. The compressors 11,12 are controlled by a controller 15, for regulating the air supply in dependence of the sailing speed, sea state and during starting and stopping.

FIG. 2 shows an air lubrication system 16 that is constructed as an integral module forming a cavity 33 that can be fitted into the substantially bottom 6 of the hull 4 of a vessel 1. The length Lc of the cavity 33 may be about 4 m, the width W being about 75 cm. By "substantially flat" is meant that the bottom extends at an angle of between +5 degrees and −5 degrees to the horizontal, butt preferably is parallel to the horizontal.

The system 16 comprises sidewalls 18, 18', a top wall 19 and a rear wall 27, all made of steel. The sidewalls 18,18' are supported on a flange 17 that can be welded into the flat bottom 6 of the vessel 1. The rear wall is 27 is welded to the sidewalls 18,18' and to the top wall 19.

The sidewalls 18,18 and the rear wall 27 delimit an opening 20 that is substantially level with the flat bottom surface of the vessel, the opening 20 forming a smooth air-water interface plane in which air is mixed into the water due to the Kelvin Helmholtz mixing effect. Air bubbles that are mixed with the water at the interface plane leave the cavity along rear edge 21 to pass in a smooth transition from the cavity onto the bottom and to travel unrestricted along the flat bottom 6 in the direction of the stern 3. The rear wall has a concavely curved, downwardly sloping wall part 27' which connects the top wall 19 with the rear edge 21 of the cavity to guide the air and water inside the cavity in a smooth flow pattern to the exit point situated along lower rear edge 21.

The front end 22 of the cavity 33 is dagger-shaped and an air inlet 23 is situated in the top wall 19. The air inlet 23 can be connected to one of the air outlet ducts 14 of the compressors 11,12 shown in FIG. 1.

Inside the cavity 33, a single wave deflector 24 extends within the cavity and is connected to the sidewalls 18, 18' via spacer arms 25.

A cross-sectional view of the air lubrication system 16 of FIG. 2 is shown in FIG. 3A, with FIGS. 3B and 3C showing details of portions IIIB and IIIC thereof. The wave deflector 24 has a planar bottom surface 24' which is spaced apart from the sidewalls by a gap g1 having a width w1 of 6 cm, allowing air from the air cavity 33 to be released through said gap g1 along the sidewalls towards the opening 20. The rear wall 27 is spaced apart from the wave deflector 24 and is closest to the planar bottom surface 24' thereof along line 27' on the rear wall, see FIG. 3B. Between the rear edge 26 of the bottom surface 24' and the rear wall 27 a further gap g2 is present, at or close to said line 27', which gap has a width w2 of 10 cm, so that air bubbles can leave the air cavity across said gap g2. The planar bottom surface 24' is arranged at a distance h1 of about 5 cm from the open interface plane 30 in which the boundary layer between air inside the cavity 16 and the water flowing along the flat bottom 6 is situated.

The height Hc of the cavity 33 may be about 25 cm. The sidewalls 18,18' may have a thickness of 16 mm, whereas the flange 17 and top wall 19 may have a thickness of 20 mm. The wave deflector 24 preferably has a thickness equal to or greater than the thickness of the flange 17.

The wave deflector 24 is positioned above the interface plane 30 within a distance of 2-15 cm thereof, for obtaining an undisturbed flow of water passing the cavity when the vessel is travelling through the water and when no air is injected into the cavity. When the cavity is full of air, the bottom surface 24' of the deflector 24 is free from the water surface. The wave deflector also helps maintaining the water surface at interface plane stable during roll motions of the vessel.

The slope of the rear wall 27 of the cavity 33 helps smooth release of the air bubbles into the boundary layer of the vessel and is designed to help to introduce the bubbles that are formed by Kelvin Helmholtz mixing into the immediate vessel surface boundary layer, minimizing vertical dispersion and optimizing drag reduction.

The shape of the front of the cavity, i.e. wedge-shaped or bullet-shaped, controls water flow and minimizes wave instability at the air/water interface and improves consistent air mixing into the boundary layer by the Kelvin Helmholtz effect.

The length of the cavity is to be chosen sufficient to create a stable Kelvin Helmholtz air mixing effect for constant air bubble generation and flow of air bubbles into the boundary layer. The size of the cavity determines both the volume of air required for stable air bubble generation and required for recovery of the cavity after air pocket collapse. Optimizing the size of the cavity determines the overall lubrication effectiveness and the efficiency of the total air generation. More information on this can be found in FIG. 4 shows a bottom view of the rear wall 27, the sidewalls 18,18' and the wave deflector 24 of FIGS. 2 and 3. In this bottom view, in which the ratio of the areas of the opening 20 of the cavity and the area of the deflector's bottom surface 24' is the same as when viewed in projection onto the interface plane 30, it can be seen more clearly that the bottom surface 24' is completely spaced apart from the sidewalls 18,18' and from the rear wall 27 and takes up at least 90% of the area of the opening 32 in this projection.

Six spacer arms 25, each of which extends parallel to the deflector's bottom surface 24' and is attached at one end to a top side (not shown) of the wave deflector 24 and at another to one of the sidewalls 18,18', ensure that there are a gap g1 and a further gap g2 which together completely surround the bottom surface 24' and spaces the bottom surface apart from the side- and rear walls 18,18' and 19. The spacers 25 themselves in the present view cover less than 10% of the area of the opening 20 that is not covered by the bottom surface 24' of the deflector, so that they substantially do no hinder the flow of water or air from the air cavity to the interface plane 30.

This particularly simple construction allows the wave deflector 24 to be removed from the air cavity 33 by detaching it from the spacers 25. For instance, the deflector 24 may be attached to the spacers 25 by means of bolts, and may be removed from the spacers by removing those bolts. Even if the deflector 24 is welded to the spacers 25, detaching the wave deflector therefrom only requires cutting through the welds at the spacers 25, and the deflector may easily be welded back onto the spacers at a later time.

The air lubrication system with the wave deflector according to the present invention provides a number of advantages over prior art wave deflectors:

Firstly, in comparison with prior art deflectors, the deflector and air lubrication system of the present invention significantly reduce drag caused by the cavity when the air lubrication system is off (without air input). When the system is off, the cavity 33 is filled or partially filled with water. However, at sailing speeds, the bottom surface, which when projected onto the interface plane 30 covers at least 90% of the area of the opening, water is substantially prevented from entering the air cavity 33 by the wave deflector. In particular, the planar bottom surface 24' of the deflector 24' substantially prevents movement of water into and out of the air cavity in a direction transverse to the planar bottom surface. As the bottom surface 24' is arranged close to the interface plane 30 and the gap g1 is relatively narrow, the flow of water across the hull and over the interface plane 30 is not significantly disturbed when the system is switched off. The relatively narrow gap also reduces the risk of solid objects such a driftwood and the like, from becoming stuck in the gap or in the air cavity.

Secondly, the wave deflector 24 enables filling the cavity 33 with air and expelling water from the cavity when the vessel is travelling at speed, using only a relatively small volume of air for filling the cavity with air. Because the gap through which the air/water mixture is expelled is relatively narrow and arranged at the outer edge of the planar bottom surface 24' of the deflector, only a relatively small volume of air has to be supplied to the cavity to push water and air out of the cavity along the outer edge. In contrast, in known air lubrication systems the deflector covers a substantially smaller area of the opening than in the present invention, so that much of the air can escape the cavity at a location where no water is present and typically a much larger volume is required to expel water from the air cavity.

Thirdly, as the wave deflector can be provided as a plate which does not extend much towards the top surface, a more compact air cavity can be provided than when curved or angled wave deflectors are used.

The present invention has been described above with reference to a number of exemplary embodiments as shown in the drawings. Modifications and alternative implementations of some parts or elements are possible, and are included in the scope of protection as defined in the appended claims.

The invention claimed is:

1. An air lubrication system for providing an air lubricating layer (9) between the hull (4) of a vessel (1) and the water flowing under the hull as said vessel is moving through the water, wherein said system is provided with an air cavity (7,8; 33) which comprises:
   walls comprising sidewalls (18,18'), a top wall (19) and a rear wall (27), said walls defining said air cavity with an opening (20) situated in an interface plane (30) arranged opposite from said top wall (19), the opening having a front end and a rear end seen in the length direction of the air cavity;
   an air inlet (23) spaced apart from the opening (20), wherein the length (Lc) of the opening of the air cavity is between 2 and 10 m, and the distance (Hc) of the top wall from the interface plane is between 0.2 m and 0.5 m;
   wherein said system further comprises a wave deflector (24) having a planar bottom surface (24') which faces said interface plane (30) and extends substantially parallel thereto and is arranged in said air cavity at a distance (h1) of 2-15 cm from the interface plane (30), wherein said bottom surface (24') has a peripheral edge that is spaced apart from said sidewalls (18,18') by a gap (g1) having a width (w1) of 0.5-15 cm, wherein, when viewed in projection onto a plane in which said planar bottom surface (24') extends, at least 85% of the area of said opening (20) is covered by said wave deflector (24) and/or said planar bottom surface (24') thereof.

2. The air lubrication system according to claim 1, wherein said gap (g1) has a substantially constant width (w1).

3. The air lubrication system according to claim 1, wherein, when viewed in said projection, said opening has an outer circumferential edge and said peripheral edge of said bottom surface has a smaller but similarly shaped contour as said outer circumferential edge and is spaced apart therefrom.

4. The air lubrication system according to claim 1, wherein, when viewed in said projection, said opening has an outer circumferential edge and the length of said gap (g1) along said opening (20) is at least half the length of said outer circumferential edge.

5. The air lubrication system according to claim 1, wherein said rear wall (27) extends from a rearward portion of the top wall to the interface plane (30) towards the rear end of the air cavity (33), and wherein said bottom surface (24') is spaced apart from said rear wall (27) by a further gap (g2) having a width (w2) of between 2-15 cm.

6. The air lubrication system according to claim 5, wherein said rear wall (27) slopes from said rearward portion of the top wall (19) towards the rear end of the air cavity.

7. The air lubrication system according to claim 1, wherein said gap (g1) and said further gap (g2) substantially surround the planar bottom surface (24') so that substantially the entire planar bottom surface is spaced apart from said walls (18,18', 27).

8. The air lubrication system according to claim 1, wherein said wave deflector comprises multiple segments which together provide said bottom surface (24').

9. The air lubrication system according to claim 1, wherein said wave deflector (24) comprises a single plate which provides the entire bottom surface (24').

10. The air lubrication system according to claim 1, wherein said wave deflector has a thickness of between 1.5 and 10 cm.

11. The air lubrication system according to claim 1, wherein the width of said planar bottom surface increases from the front end of the cavity towards the rear end of the air cavity along at least half the length of said planar bottom surface.

12. The air lubrication system according to claim 1, further comprising a plurality of spacer arms (25) which connect said wave deflector (24) to the walls (18,18',19,27) of said air cavity and bridge the gap there between.

13. The air lubrication system according to claim 12, wherein said spacer arms (25) extend substantially parallel to said planar bottom surface (24').

14. The air lubrication system according to claim 1, wherein said planar bottom surface is a contiguous planar surface, wherein all line segments between any two points on the outer circumferential edge of said bottom surface are completely contained within said surface (24').

15. Vessel (1) comprising a hull (4) and an air lubrication system (16) according to claim 1, the vessel having a substantially flat bottom (6), a propulsion device (10) for sailing of the vessel, the interface plane (30) being substantially at the level of the flat bottom (6).

16. The air lubrication system of claim 1, wherein, when viewed in projection onto a plane in which said planar bottom surface (24') extends, at least 90% of the area of said opening (20) is covered by said wave deflector (24) and/or said planar bottom surface (24') thereof.

17. The air lubrication system of claim 1, wherein, when viewed in projection onto a plane in which said planar bottom surface (24') extends, at least 95% of the area of said opening (20) is covered by said wave deflector (24) and/or said planar bottom surface (24') thereof.

18. The air lubrication system according to claim 1, wherein, when viewed in said projection, said opening has an outer circumferential edge and the length of said gap (g1) along said opening (20) is at least three fourths the length of said outer circumferential edge.

19. The air lubrication system according to claim 1, wherein, when viewed in said projection, said opening has an outer circumferential edge and the length of said gap (g1) along said opening (20) is at least five sixths the length of said outer circumferential edge.

20. The air lubrication system according to claim 1, wherein the width of said planar bottom surface increases from the front end of the cavity towards the rear end of the air cavity along substantially the entire length of said planar bottom surface.

* * * * *